Dec. 20, 1949    R. E. BALLENTINE ET AL    2,491,946
ELECTRODE HOLDING DEVICE
Filed May 13, 1947
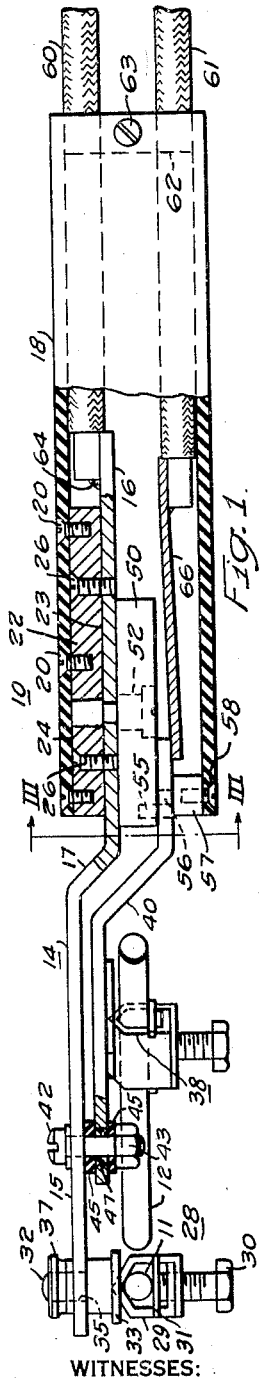
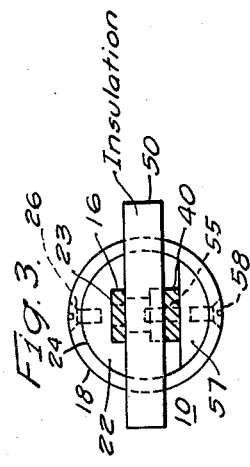
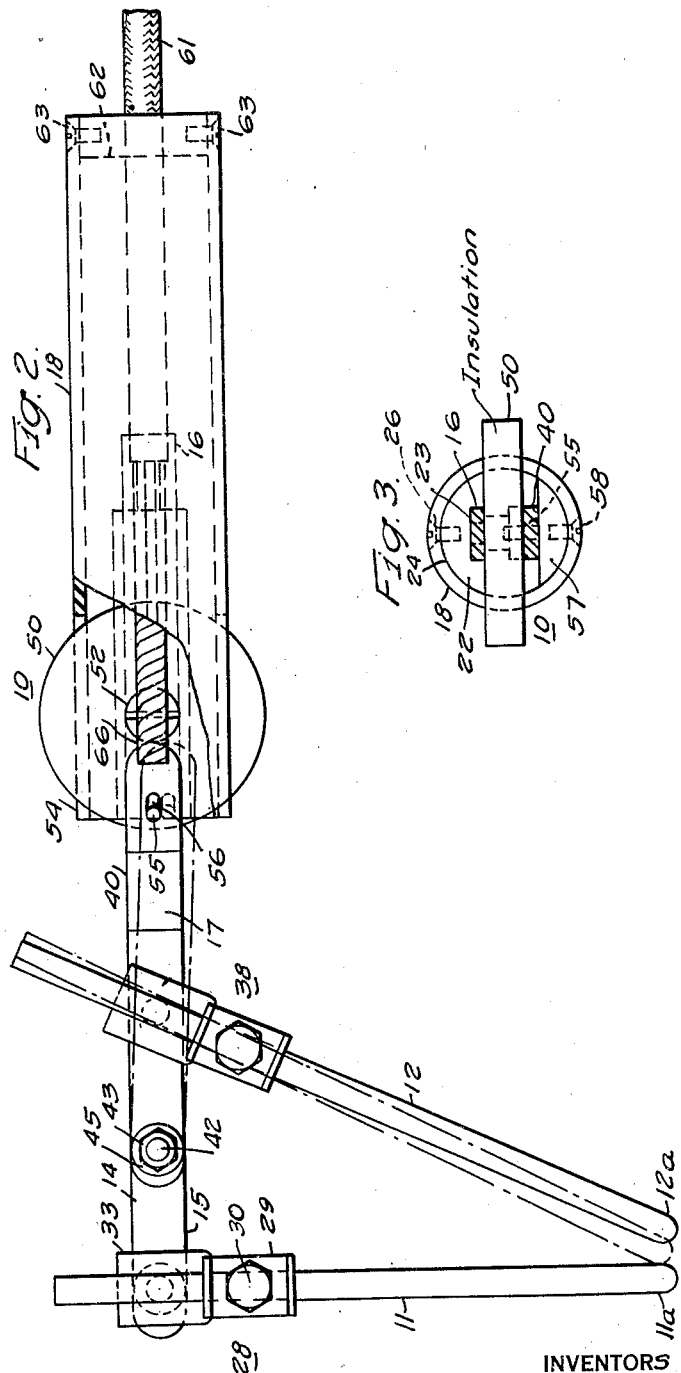
WITNESSES:
INVENTORS
Richard E. Ballentine and
Frederick V. Schilling.
BY
G. M. Crawford
ATTORNEY Patented Dec. 20, 1949

2,491,946

UNITED STATES PATENT OFFICE 2,491,946

ELECTRODE HOLDING DEVICE

Richard E. Ballentine, Snyder, and Frederick V. Schilling, Buffalo, N. Y., assignors to Westinghouse Electric Corporation, East Pittsburgh, Pa., a corporation of Pennsylvania Application May 13, 1947, Serial No. 747,786

8 Claims. (Cl. 219—14)

Our invention relates generally to an electrode holding device, and it has reference in particular to an arc torch for holding and manipulating a pair of electrodes such as may be used in carbon arc welding, brazing and the like.

Generally stated, it is an object of our invention to provide an arc torch which is simple and inexpensive to manufacture, and which is easy to use.

More specifically, it is an object of our invention to provide a carbon arc torch wherein the angular relation of the carbon electrodes relative to each other may be adjusted for maintaining a substantially constant length of arc.

Another object of our invention is to provide for adjusting the electrodes of a carbon arc torch in a plane which passes through the longitudinal axis of the torch.

Yet another object of our invention is to provide for rotating one carbon electrode in an arc torch about a point which lies on the bisector of the angle between the electrodes.

It is also an object of our invention to provide, in a carbon arc torch, for mounting one electrode on a projecting conductor, and pivotally mounting a second electrode on the same conductor for rotation about a point intermediate the electrodes.

It is an important object of our invention to provide a carbon arc torch having solid electrical connections to both electrodes.

A further object of our invention is to provide, in a carbon arc torch, for obtaining adjustment of the carbon electrodes relative to each other by changing the angular relationship between them.

Other objects will, in part, be obvious and will, in part, be explained hereinafter.

In practicing our invention in one of its forms, a holder or clamp for one of the two carbon electrodes is mounted on a substantially rigid conductor projecting endwise from a handle. A holder or clamp for the second electrode is mounted on a lever which is pivotally connected at one end to the aforesaid rigid conductor, and is adustably supported at the other end by an eccentric pin on an adjusting wheel rotatably mounted in the handle. Cables for supplying current to electrodes in the holders are brazed to the rigid conductor and to the moving end of the lever which is supported in insulated relation to the rigid conductor. The second electrode is moved relative to the other electrode by rotating the adjusting wheel.

For a more complete understanding of the nature and scope of our invention, reference may be made to the following detailed description, which may be read in connection with the accompanying drawing, in which:

Figure 1 is a plan view, broken out in part, of an arc torch embodying the invention in one of its forms;

Fig. 2 is a side elevational view, broken out in part, of the arc torch shown in Fig. 1; and Fig. 3 is a sectional view taken along the line III—III of Fig. 1.

Referring to the drawing, the reference numeral 10 may denote, generally, a carbon arc torch wherein carbon electrodes 11 and 12 are disposed to be supported in adjustable angular relation with each other for striking and maintaining an arc between their adjacent ends 11a and 12a.

The torch 10 may comprise an elongated substantially rigid conductor support 14 having relatively flat end portions 15 and 16 joined by an offset portion 17 intermediate the ends to permit mounting the electrodes on substantially the longitudinal axis of the holder. A handle comprising a tubular member 18 of insulating material may be secured to the end portion 17 of the conductor support 14. The handle 18 may, for example, be connected by means of screws 20 to a support block 22 having a relatively flat surface on one side with a longitudinal groove 23 for receiving the end portion 17, and having an arcuate surface 24 on the other side conforming to the inner surface of the tubular handle 18. The support block 22 may be secured to the conductor support 14 in any suitable manner, being, for example, secured thereto by means of screws 26.

An electrode holder or clamp 28 may be secured to the other end of the conductor support 14 comprising, for example, an apertured body member 29 for receiving the carbon electrode 11, and provided with a set screw 30 and a movable clamping plate 31 for securing the electrode therein. The body member 29 may be secured to the conductor support 14 by means of a bolt 32 which passes through an upwardly projecting lug 33 secured to the body member, and through an opening 35 adjacent the end of the conductor support. A thumb nut 37 may be provided on the bolt 32 for securing the body member 29 to the conductor support in different angular relations therewith.

In order to provide for adjusting the carbon electrode 12 relative to the electrode 11, an additional electrode holder or clamp 38, similar to the holder 28, may be mounted on a lever or support 40. The lever 40 may be offset similar to the conductor support 14, and may be pivotally mounted on the conductor support 14, being connected thereto at the end remote from the handle by means of a bolt 42 and nut 43. In order to insulate the lever support 40 from the conductor support 14, fiber washers 45 may be positioned on each side of the lever 40, and a tube of insulating material 47 positioned about the bolt 42 between the washers.

Adjustment of the electrode 12 relative to the electrode 11 may be obtained by actuating the free end of the lever 40 to pivot the lever about the bolt 42. For example, adjusting means such as a wheel 50 of insulating material may be rotatably mounted adjacent the end portion 17 of the conductor support 14 for actuating the free end of the lever. The wheel 50 may, for example, be rotatably mounted on a pin 52 which is threaded into the support block 22. The wheel may be positioned in an axial slot 54 adjacent the end of the handle 18 so as to be substantially within the confines of the handle where it may be readily actuated by the operator without disturbing the position of the torch during a welding operation. The lever 40 may be operatively connected to the wheel 50 by means of an eccentric pin 55 which projects from the wheel on the face remote from the conductor support 14, and is positioned in a longitudinal slot 56 in the lever. A bearing block 57 may be secured within the slotted end of the handle 18 by means of a screw 58 for retaining the lever 40 on the eccentric pin 55.

By rotating the wheel 50 in a clockwise direction, the free or movable end of the lever 40 may be raised so as to separate the adjacent ends of the electrodes 11 and 12 for striking or increasing the length of an arc therebetween. By rotating the wheel 50 in a counterclockwise direction the lever 40 may be moved to the dot-and-dash position, wherein the electrode 12 will move toward the electrode 11 to decrease the length of the arc or to engage the electrode 11 for initiating an arc, as shown by the dot-and-dash outline.

Electrical connections may be made to the electrodes 11 and 12 by means of conductors 60 and 61 which pass through openings in an end piece 62 which may be secured within the end of the handle 18 by means of screws 63. The cable 60 may be connected directly to the end 16 of the conductor support 14 by means of a weld 64. The cable 61 may be connected to the adjacent end of the lever 40 by means of a flexible connector 66 which may be welded or brazed to the end of the cable 61 and to the adjacent end of the lever 40.

From the above description, it will be apparent that we have provided in a simple and effective manner for adjustably supporting a pair of carbon electrodes for striking and maintaining an electric arc therebetween. The electrodes are positioned in a plane which passes through the line of a weld and also passes through the center line or longitudinal axis of the torch handle. This permits a ready view of the arc and facilitates welding in corners and crevices. By rotating the adjustable carbon electrode about a point between the two carbons, a constant length of arc may be readily held between the tips of the electrodes. Since the center of rotation of the adjustable electrode is positioned substantially on the bisector of the angle between the two electrodes, the necessity for using wing nuts or other similar adjusting devices for connecting the carbon holders to the supporting members is obviated. The movable electrode may be readily adjusted by movement of the adjusting wheel and is easily retained in any given operating position, merely by the friction of the wheel mounting and of the pivotal connection of the support lever to the conductor support.

Since certain changes may be made in the above described construction, and different embodiments of the invention may be made without departing from the spirit or scope thereof, it is intended that all the matter contained in the above description and shown in the accompanying drawing shall be considered as illustrative and not in a limiting sense.

We claim as our invention:

1. An arc torch comprising, a handle, a rigid conductor projecting therefrom, a holder for an electrode supported by the rigid conductor, an additional holder, and support means adjustably supporting the additional holder relative to the first mentioned holder including a lever extending longitudinally alongside the rigid conductor and pivotally connected to the rigid conductor intermediate the additional holder and the first-mentioned holder and a wheel having an eccentric connection with the lever adjacent the end remote from the pivotal connection and rotatably supported with respect to the handle.

2. An arc torch comprising, a handle, a rigid conductor projecting from one end of the handle, a clamp for securing an electrode mounted adjacent the projecting end of the rigid conductor, a lever having a clamp for securing an additional electrode mounted intermediate the ends of the lever, support means pivotally connecting one end of the lever to the conductor intermediate the first mentioned clamp and the handle, and adjusting means including a wheel rotatably supported on the conductor adjacent the handle and having an eccentric connection with the lever adjacent its other end.

3. In an arc torch, an elongated handle of insulating material having a longitudinal slot adjacent one end, a rigid conductor secured to the handle and projecting from the slotted end, an electrode holder secured to the conductor adjacent the projecting end, a lever pivotally connected at one end to the conductor intermediate the projecting end and the handle and extending toward the handle, an electrode holder mounted on the lever intermediate the ends of the lever, and rotatable adjusting means positioned in the slot in the handle and having an eccentric connection with the other end of the lever.

4. A torch comprising, an elongated rigid conductor member, a clamp for an electrode secured to the conductor member adjacent one end, a handle secured to the conductor member adjacent the other end, a lever member, support means pivotally connecting one end of the lever member to the conductor member at a point spaced from the handle, a wheel rotatably mounted on the conductor member adjacent the handle having an eccentric connection with the other end of the lever member, and clamp means on the lever member for an additional electrode.

5. An arc torch comprising, a tubular handle of insulating material, a rigid elongated conductor member having one end secured within the handle and the other end projecting axially therefrom, an electrode holder secured in conducting relation to the conductor member adjacent the projecting end, a conducting lever member having an electrode holder secured thereto intermediate its ends and in conducting relation thereto, support means pivotally connecting the lever member to the conductor member in insulated relation intermediate the handle and the projecting end of the conductor member, a disc of insulating material rotatably mounted on the conductor member adjacent the handle and having an eccentric connection with the lever member, and conductor means connected to the conductor member and lever member.

6. An arc torch comprising, a tubular handle of insulating material having an axial slot at one end, an elongated rigid conductor having one end secured within the handle on one side of the slot and projecting axially therefrom, a clamp for an electrode secured to the conductor adjacent the projecting end, a conducting lever pivotally connected adjacent one end to the conductor in insulated relation intermediate the handle and the projecting end of the conductor, said lever being positioned on the same side of the conductor as said clamp and having a free end extending within the end of the handle, a wheel of insulating material positioned in the slot and rotatably mounted on the conductor, eccentric means connecting the free end of the lever to the wheel, and a clamp for an electrode secured to the lever intermediate its ends.

7. In an arc torch, a tubular handle of insulating material having an axial slot at one end, an elongated conductor having one end positioned within the slotted end of the handle, said conductor being secured to the handle on one side of the longitudinal axis thereof and projecting from the handle with an offset beyond the end of the handle in a direction away from the longitudinal axis of the handle, a holder secured to the conductor adjacent the projecting end thereof arranged to position an electrode transversely of the longitudinal axis and substantially in a plane through said axis, a conducting lever having a holder for an electrode intermediate the ends of the lever, said lever being disposed with one of its ends within the slotted end of the handle and the other end extending toward the projecting end of the conductor, support means pivotally connecting said other end in insulated relation to the conductor intermediate the holders, and a disc of insulating material positioned in the slot and rotatably mounted on the conductor, said disc having an eccentric connection with the end of the lever adjacent the handle.

8. An arc torch comprising, an elongated rigid conductor, a lever extending longitudinally of and disposed along one side of the rigid conductor and in spaced relation therewith, clamp means for a pair of electrodes disposed one each on the conductor and lever to position the electrodes in angular relation, means pivotally connecting one end of the lever to the conductor at a point adjacent the clamp means on the rigid conductor and substantially on the bisector of the angle between the electrodes, and adjusting means mounted on the rigid conductor operable to rotate the free end of the lever about the pivotal connection.

RICHARD E. BALLENTINE.
FREDERICK V. SCHILLING.

REFERENCES CITED

The following references are of record in the file of this patent:

UNITED STATES PATENTS

| Number | Name | Date |
| --- | --- | --- |
| 606,342 | Hirsch | June 28, 1898 |
| 640,464 | Gillett et al. | Jan. 2, 1900 |
| 1,533,874 | Livermore | Apr. 14, 1925 |
| 1,618,080 | Gibbons | Feb. 15, 1927 |
| 1,650,431 | Crandall | Nov. 22, 1927 |
| 2,300,203 | Campbell | Oct. 27, 1942 |

FOREIGN PATENTS

| Number | Country | Date |
| --- | --- | --- |
| 553,914 | Great Britain | June 10, 1943 |
| 352,485 | Italy | Sept. 15, 1937 |